United States Patent Office 2,723,276
Patented Nov. 8, 1955

2,723,276

COUMARIN DERIVATIVES AND PROCESS FOR THE MANUFACTURE THEREOF

André Grüssner and Balthasar Hegedüs, Basel, Switzerland, assignors to Hoffmann-La Roche Inc., Nutley, N. J., a corporation of New Jersey No Drawing. Application May 15, 1953,
Serial No. 355,394

Claims priority, application Switzerland May 16, 1952

The portion of the term of the patent subsequent to February 8, 1972 has been disclaimed 6 Claims. (Cl. 260—343.2)

The present invention relates to novel coumarin derivatives and to a process for the manufacture thereof.

The said novel coumarin derivatives may be represented by the general formula

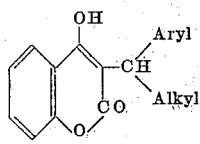

wherein the nucleus of the aryl radical may carry a halogen atom. Examples of such aryl radicals are the phenyl or naphthyl radical as well as the halogenated derivatives thereof, such as p-chlorophenyl, chloronaphthyl and other similarly substituted radicals. The alkyl groups may be for example a methyl, an ethyl, a propyl, a butyl or a pentyl group. The novel coumarins according to the invention are stable, colorless, and crystallized substances, which are only slightly soluble in water and in the usual organic solvents, such as methanol, ethanol, benzene, toluene, acetone, dioxane. These compounds are easily soluble in aqueous alkali hydroxide solution and in aqueous alkali carbonate solutions. They are capable, even in very low concentrations, to reduce the prothrombine contents of the blood, and, therefore, may be used as pharmaceuticals. As especially valuable in this respect have been found 3-(1'-phenylpropyl)-4-hydroxy-coumarin, 3-(1'-phenyl-n-butyl)-4-hydroxy-coumarin and 3-(1'-p-chlorophenyl-propyl)-4-hydroxy-coumarin.

The invention also provides a process for the manufacture of the said novel coumarin derivatives, which process comprises reacting a 3-acyl-4-hydroxy-coumarin (II) with an organo-metal compound (III) of the general formula R—X, wherein X represents the radical Li, MgCl, MgBr or MgI and, if the 3-substituent is an aliphatic acyl radical, R stands for an aryl radical the nucleus of which may carry a halogen atom or, if the 3-substituent is an aromatic acyl radical, R stands for an alkyl radical; separating water from the condensation product formed; and hydrogenating the dehydration product.

The reactions involved may be illustrated as follows:

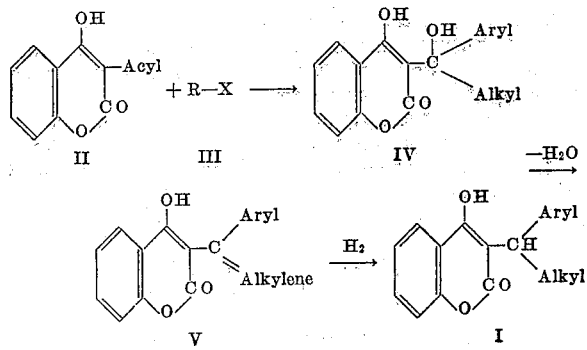

Especially suitable starting materials for the process according to the invention are on the one hand 3-benzoyl-4-hydroxy-coumarin and aliphatic organo-metal compounds, more particularly ethyl-magnesium halides, n-propyl-magnesium halides, n-butyl-magnesium halides and, on the other hand, 3-propionyl-4-hydroxy-coumarin and aromatic organo-metal compounds the nucleus of which may carry a chlorine atom, more particularly phenyl-magnesium halides and p-chlorophenyl-magnesium halides, for example phenyl-magnesium bromide or p-chlorophenyl-magnesium iodide, phenyl-lithium, naphthyl-magnesium halides.

The active acidic hydrogen atom contained in the hydroxyl group in 4-position binds part of the organo-metal compound. It is therefore recommendable to add an excess of the latter over the molar proportion with respect to the 3-acyl-4-hydroxy-coumarin.

The tertiary carbinol IV formed by reaction of the organo-metal compound III with the acylated 4-hydroxy-coumarin II need not be isolated, but may advantageously be immediately subjected to dehydration to produce the unsaturated compound V. The said dehydration may suitably be effected by heating the carbinol IV with small amounts of p-toluene-sulphonic acid in toluene, the water formed being continuously eliminated by azeotropic distillation with the toluene. The hydrogen atom needed for the elimination of the water molecule from the carbinol IV is furnished by the $CH_2$-group of the alkyl radical adjacent to the tertiary hydroxyl carrying carbon atom.

Th unsaturated compound V is then catalytically hydrogenated. This may be effected in a suitable solvent, such as dioxane or ethanol. Compound V need however not necessarily be isolated from the solution obtained after the dehydration procedure, this solution being suitable for the following hydrogenation step. It is advantageous to add a slightly active catalyst (for example palladium charcoal) to the hydrogenation solution.

Example 1

To a solution of ethyl-magnesium bromide, prepared according to usual methods from 4 parts by weight of magnesium and 18 parts by weight of ethyl bromide in about 400 parts by volume of absolute ether, are added with stirring 13.3 parts by weight of 3-benzoyl-4-hydroxy-coumarin (Journal of the Chemical Society, London, 1927, page 1705) and the mixture is refluxed for 3 hours with stirring. Thereupon a mixture of 15 parts by volume of concentrated hydrochloric acid and 400 parts by volume of water is added. The ethereal layer is extracted with 200 parts by volume of 3 N sodium hydroxide solution, the alkaline aqueous extract is washed with 50 parts by volume of toluene and cautiously acidified by means of concentrated hydrochloric acid. The oil precipitated is taken up in 200 parts by volume of toluene, the toluene solution is dried with calcium chloride, the drying agent is filtrated off, 0.1 part by weight of p-toluene-sulphonic acid is added and the mixture is refluxed in a water separator until the separation of water has come to an end. The toluene solution is concentrated in vacuo at 40–50° C. to dryness and the residue is dissolved in 100 parts by volume of ethanol. Small amounts (about 0.8–0.9 part by weight) of unreacted 3-benzoyl-4-hydroxy-coumarin separate and are filtered off. The ethanol is distilled off in vacuo and the residual resin obtained is triturated with ether. This operation brings the unsaturated compound 3 - [1' - phenyl - propene-(1')yl]-4-hydroxy-coumarin to separation. Melting point 178–179° C.

1.4 parts by weight of 3-[1'-phenyl-propene-(1')yl]-4-hydroxy-coumarin are dissolved in 30 parts by volume of dioxane and hydrogenated in the presence of a small amount of palladium charcoal. The amount of hydrogen needed for the saturation of the double bond is taken up rapidly. After having filtrated off the catalyst, distilled off the dioxane in vacuo and upon recrystallization in toluene the 3-(1'-phenyl-propyl)-4-hydroxy-coumarin formed is obtained as white crystals of 179–180° C. The latter compound shows in mixture with the unsaturated intermediate product a melting point depression of 25–30° C.

In an alternative procedure, the ethanolic filtrate, obtained after having separated off the unreacted 3-benzoyl-4-hydroxy-coumarin, may be shaken with hydrogen in the presence of palladium charcoal without isolating the unsaturated compound.

*Example 2*

To a solution of n-propyl-magnesium bromide, prepared according to known methods from 4 parts by weight of magnesium and 20.5 parts by weight of n-propyl bromide in about 400 parts by volume of absolute ether, are added with stirring 13.3 parts by weight of 3-benzoyl-4-hydroxy-coumarin and the mixture is refluxed for 3 hours with stirring. The reaction mixture is subjected to the same operations as described in Example 1. However, instead of isolating the unsaturated compound 3-[1'-phenyl-n-butene-(1')yl]-4-hydroxy-coumarin formed, the ethanolic solution obtained after having filtered off small amounts of unreacted 3-benzoyl-4-hydroxy-coumarin is shaken with hydrogen in the presence of palladium charcoal. After having separated off the catalyst and concentrated the solution in vacuo, and upon recrystallizing the residue in toluene, the 3-(1'-phenyl-n-butyl)-4-hydroxy-coumarin formed is obtained as white crystals of melting point 201–202° C.

*Example 3*

To a solution of n-butyl-magnesium bromide, prepared as usual from 4 parts by weight of magnesium, 22.5 parts by weight of n-butyl bromide in about 400 parts by volume of absolute ether, are added with stirring 13.3 parts by weight of 3-benzoyl-4-hydroxy-coumarin and the mixture is refluxed for 4 hours with stirring. The reaction mixture obtained is subjected to the same operations as described in Example 1. The alcoholic solution of the unsaturated compound may either be immediately subjected to hydrogenation without isolating the said unsaturated compound, or the latter, i. e. 3-[1'-phenyl-n-pentene-(1')yl]-4-hydroxy-coumarin of melting point 152–154° C., is first isolated and then hydrogenated. The product of the hydrogenation, i. e. 3-(1'-phenyl-n-pentyl)-4-hydroxy-coumarin, melts at 178–180° C.

*Example 4*

To a solution of phenyl-magnesium bromide, prepared as usual from 3.8 parts by weight of magnesium and 24 parts by weight of bromobenzene in 400 parts by volume of absolute ether, are added with stirring 10.3 parts by weight of 3-propionyl-4-hydroxy-coumarin (Journal of the American Chemical Society, volume 72 [1952], page 5143) and the mixture is refluxed for 3 hours with stirring. The reaction mixture is subjected to the same series of operations as described in Example 1. Both the unsaturated compound 3-[1'-phenyl-propene-(1')yl]-4-hydroxy-coumarin, which may be isolated, and the hydrogenated end product 3-(1'-phenyl-propyl)-4-hydroxy-coumarin are identical with the corresponding compounds disclosed in Example 1.

*Example 5*

To a phenyl-lithium solution, prepared according to known methods from 1.2 parts by weight of lithium and 24 parts by weight of bromobenzene in about 400 parts by volume of absolute ether under dry nitrogen, are added with stirring 10.3 parts by weight of 3-propionyl-4-hydroxy-coumarin and the mixture is refluxed for 3 hours with stirring. The further handling of the solution is the same as described in Example 1 or 4, and the end product obtained is the same, i. e. 3-(1'-phenylpropyl)-4-hydroxy-coumarin.

*Example 6*

To a solution of α-naphthyl-magnesium bromide, prepared as usual from 3.8 parts by weight of magnesium and 31 parts by weight of α-bromo-naphthalene in about 400 parts by volume of absolute ether, are added with stirring 10.3 parts by weight of 3-propionyl-4-hydroxy-coumarin and the mixture is refluxed for 3 hours with stirring. The mixture is subjected to the same operations as disclosed in Example 1. The product of the hydrogenation, i. e. 3-[α-(1'-naphthyl)-propyl]-4-hydroxy-coumarin, after having been recrystallized in toluene, melts at 202–204° C.

*Example 7*

To a solution of p-chloro-phenyl-magnesium iodide, prepared according to known methods from 3.8 parts by weight of magnesium and 36 parts by weight of p-chlorophenyl-iodide in about 400 parts by volume of absolute ether, are added with stirring 10.3 parts by weight of 3-propionyl-4-hydroxy-coumarin and the mixture is refluxed for 3 hours with stirring. A mixture of 15 parts by volume of concentrated hydrochloric acid and 400 parts by volume of water is added. The ethereal layer is extracted with 200 parts by volume of 3 N sodium hydroxide solution, the alkaline aqueous extract is washed with 50 parts by volume of toluene and thereupon cautiously acidified by means of concentrated hydrochloric acid. The oil precipitated is taken up in 200 parts by volume of toluene, 0.1 part by weight of p-toluene-sulphonic acid is added and the mixture is refluxed in a water separator until the separation of water has come to an end. Thereupon the toluene solution is concentrated in vacuo at 40–50° C. to dryness, and the residue is dissolved in 200 parts by volume of ethanol. About 0.3–0.4 part by weight of unreacted 3-propionyl-4-hydroxy-coumarin which does not dissolve is filtrated off. The ethanol is distilled off in vacuo and the residual resin is triturated with ether. This operation brings the 3-[α-(4'-chlorophenyl)-propen-1-yl]-4-hydroxy-coumarin of melting point 203–204° C. to separation.

3.7 parts by weight of this compound are dissolved in 50 parts by volume of dioxane and hydrogenated in the presence of Raney nickel. The amount of hydrogen needed to hydrogenate the double bond is taken up within about 30–40 minutes. The catalyst is filtrated off, the dioxane is distilled off in vacuo, whereupon after having been recrystallized in toluene, white crystals of 3-(1'-p-chlorophenyl - propyl) - 4 - hydroxy-coumarin of melting point 186–188° C. are obtained.

We claim:

1. A coumarin derivative which may be represented by the general formula

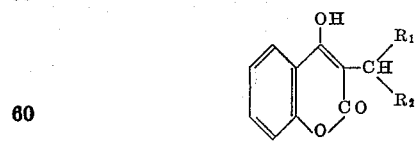

wherein $R_1$ is selected from the group consisting of halogenated phenyl, naphthyl and halogenated naphthyl radicals, and $R_2$ stands for an alkyl radical containing not more than 5 carbon atoms.

2. 3-[α-(1'-naphthyl)-propyl]-4-hydroxy-coumarin.

3. 3-(1'-p-chlorophenyl-propyl)-4-hydroxy-coumarin.

4. A process which comprises condensing a compound of the formula

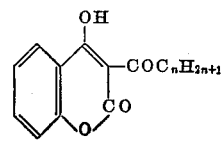

wherein $n$ represents an integer from 1 to 5, inclusive, with an organo-metal compound of the formula R—X wherein R represents a radical selected from the group consisting of phenyl, naphthyl, halogenated phenyl and halogenated naphthyl, and X represents a radical selected from the group consisting of —Li, —MgCl, —MgBr and —MgI and hydrolyzing to produce a compound of the formula

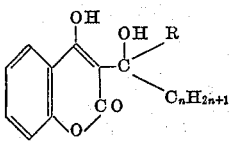

wherein $n$ and R have the same meaning as above; dehydrating the latter to produce a compound of the formula

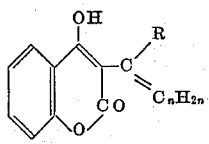

wherein $n$ and R have the same meaning as above; and hydrogenating the latter to produce a compound of the formula

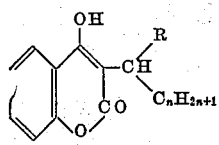

wherein $n$ and R have the same meaning as above.

5. A process which comprises reacting a compound of the formula

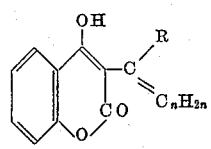

wherein $n$ represents an integer from 1 to 5, inclusive, and R represents a radical selected from the group consisting of phenyl, naphthyl, halogenated phenyl and halogenated naphthyl with one mol of elemental hydrogen in the presence of a hydrogenation catalyst to produce a compound of the formula

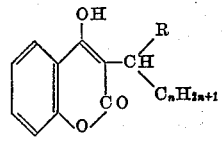

wherein $n$ and R have the same meaning as above.

6. A process which comprises reacting 3-(1'-p-chlorophenyl-propen-1'-yl)-4-hydroxy-coumarin with one mol of elemental hydrogen in the presence of a hydrogenation catalyst to produce 3-(1'-p-chlorophenyl-propyl)-4-hydroxy-coumarin.

References Cited in the file of this patent

UNITED STATES PATENTS

| | | |
|---|---|---|
| 2,471,047 | Stahmann et al. | May 24, 1949 |
| 2,648,683 | Litvan et al. | Aug. 11, 1953 |

OTHER REFERENCES

Chem. Abst., vol. 41, col. 6232 (1947).
Lowenbein et al.: Annalen 448, 224–236 (1926).
Smith et al.: JACS 62, 145–47 (1940).